United States Patent Office 2,823,196
Patented Feb. 11, 1958

2,823,196

THERMOPLASTIC COMPOSITIONS HAVING IMPROVED LIGHT STABILITY

Carl B. Havens, Hope, Mich., assignor to The Dow Chemical Company, Midland, Mich., a corporation of Delaware No Drawing. Application November 3, 1955
Serial No. 544,820

3 Claims. (Cl. 260—45.95)

This invention relates to new and improved thermoplastic compositions. More particularly, it relates to polymeric compositions having improved stability to the degradative effects of sunlight.

Thermoplastic compositions, particularly those prepared from haloethylene polymers, have found wide acceptance as useful materials for making foils, fibers, filaments, and other articles. The articles so produced are inherently strong, dimensionally stable, relatively inert to common household solvents and are easily colored for an attractive appearance. However, such articles are subject to rapid and severe degradation and consequent discoloration due to the effects of heat and light. The problem becomes most serious when polymeric compositions are employed as filamentary materials in making window curtains, automobile seat covers, and other articles which are exposed for prolonged periods of time to direct sunlight. To overcome this disadvantage it has become most practical to incorporate certain additives into the composition to stabilize it to the effects of heat and to add other materials to the composition to stabilize it to the effects of light. Some of the prior light stabilizing materials have suffered from the disadvantages of bleeding out of articles made from polymeric vinyl or vinylidene halides. In addition, some of the materials are colored so that they impart an objectionable initial color to the composition which prevents the production of white articles. Further, many of the prior materials lose their effectiveness as light stabilizers after exposure to sunlight for a short time.

It is accordingly an object of this invention to provide improved polymeric compositions having increased resistance to the degradative effects of light.

It is a particular object to provide such a composition which is based on a chloroethylene polymer and is resistant to the effects of light over prolonged periods of exposure to direct sunlight.

The above and related objects are achieved with a polymeric composition comprising a linear polymer or other thermoplastic material and stabilizing quantities of a diacyl derivative of a non-vicinal dihydroxy benzene having the general formula:

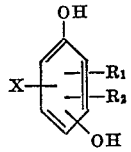

wherein the second OH group may be located in the meta- and para-position to the first OH group, $R_1$ and $R_2$ are aliphatic acyl groups having from 2 to 12 carbon atoms and X is selected from the group consisting of hydrogen, halogen, alkyl and substituted alkyl having from 1 to 4 carbon atoms.

Among the specific compounds defined by the foregoing formula and which have light stabilizing action in thermoplastic compositions are:

2,4-diacetyl resorcinol
4,6-diacetyl resorcinol
2,4-dicaproyl resorcinol
2,4-dilauroyl resorcinol
2,5-diacetyl hydroquinone
2,5-dicapryloyl hydroquinone
2,4-diacetyl-6-chlororesorcinol
2,4-diacetyl-6-tert.-butylresorcinol The polymers which may be employed in the compositions of this invention may be selected from a wide variety of polymers, such as polystyrene, polyethylene, and cellulosic esters and ethers. However, especially advantageous results are obtained when haloethylene polymers, such as the polymers of vinyl chloride, copolymers of vinyl chloride and vinylidene chloride, and copolymers of vinylidene chloride with other copolymerizable monomers in which the vinylidene chloride is present in an amount of at least 50 percent of the copolymer are employed, and such polymers are preferred in preparing the compositions. The haloethylene polymers present an unusual problem in that once degradation has started the effect seems to be autocatalytic, and thus the problem of stabilization is made more difficult.

The stabilizing agents of this invention may be easily prepared from readily available materials by a number of known methods. As representative of the preparation of the compounds a method for the preparation of diacetyl resorcinol will be described. In this method an orthodichlorobenzene solution of resorcinol, acetyl chloride, and a slight excess of aluminum chloride is subjected to a temperature of 120° C. for one-half hour after which dilute HCl is added to the reaction mixture. The product may be purified by distillation or by recrystallization from methanol or by both processes. When produced by this method the product is found to consist of a mixture of 2,4- and 4,6-diacetyl resorcinol isomers. Such mixtures present no problem, however, since the mixtures have been found to be equivalent to either of the two isomers in light stabilizing effectiveness. The substituted derivatives of diacyl resorcinol and of diacyl hydroquinone may be prepared by the above method by using the corresponding starting materials.

The diacyl dihydroxy benzene derivatives of this invention may be employed in amounts of from 0.5–5.0 percent by weight based on the weight of the copolymer employed. Most polymeric compositions comprise many ingredients such as plasticizers, fillers, pigments, and heat stabilizers, and the derivatives of this invention may be employed in the compositions in conjunction with such additives without any adverse effects. Likewise, the derivatives may be used in conjunction with other known light stabilizers.

The ingredients may be intermixed by milling or blending by known conventional methods.

The compositions of this invention show superior resistance to degradation due to light over prior compositions. This superiority will be more apparent from the following illustrative example in which all parts are by weight.

EXAMPLE

A series of three samples were made consisting of 91.5 parts of a copolymer prepared from a monomeric mixture consisting of 85 percent vinylidene chloride and 15 percent vinyl chloride, 7 parts of acetyl triethyl citrate as plasticizer and 0.5 part of tetrasodium pyrophosphate as a heat stabilizer. One of the samples was left as a blank, to one was added 1 part of 2,4-diacetyl resorcinol, and to the last was added 1 part of 4,6-diacetyl resorcinol. Each sample was molded into a sheet 0.01 inch thick. All of the sheets were then exposed to direct sunlight in the State of Florida for one month. After exposure the sheets were examined visually and in addition the percent retention of ability to transmit light of a wavelength of 5600 A. was determined. The results of this test are listed in the following table.

*Table*

| Stabilizer | Original color | Color after 1 month exposure | Percent Retention of transmission at 5,600A. |
|---|---|---|---|
| None | colorless | brown | 66 |
| 2,4-diacetyl resorcinol | do | slightly brown | 80 |
| 4,6-diacetyl resorcinol | do | light tan | 96 |

The above results show that the diacetyl derivatives effectively stabilize the polymers to the degradative effects of light.

Similar results are obtained when 2,4-dilauroyl resorcinol, 2,4-diacetyl-6-chlororesorcinol, and 2,5-diacetyl hydroquinone are employed in place of the diacetyl resorcinol derivatives.

I claim:

1. A light stable composition of matter comprising a haloethylene polymer normally subject to discoloration on exposure to light and from 0.5 to 5 percent of the weight of said thermoplastic material of a diacyl dihydroxy benzene derivative as a stabilizer having the general formula:

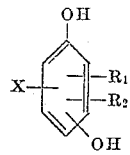

wherein the hydroxyl groups are in non-vicinal positions, $R_1$ and $R_2$ are aliphatic acyl groups derived from carboxylic acids having from 2 to 12 carbon atoms, and X is selected from the group consisting of hydrogen, halogen, aryl, alkyl and substituted alkyl.

2. The composition claimed in claim 1 wherein the diacyl dihydroxy benzene is 2,4-diacetyl resorcinol.

3. The composition claimed in claim 1 wherein the diacyl dihydroxy benzene is 4,6-diacetyl resorcinol.

References Cited in the file of this patent

UNITED STATES PATENTS 2,393,794    Meyer et al. _____ Jan. 29, 1946

FOREIGN PATENTS 714,772    Great Britain _____ Sept. 1, 1954

OTHER REFERENCES

Hackh's Chemical Dictionary, 3rd edition, page 18, McGraw-Hill, 1944.